(12) United States Patent
Kobayashi et al.

(10) Patent No.: US 10,551,224 B2
(45) Date of Patent: Feb. 4, 2020

(54) ENCODER AND LIGHT SOURCE OF ENCODER

(71) Applicant: MITUTOYO CORPORATION, Kanagawa (JP)

(72) Inventors: Hirokazu Kobayashi, Saitama (JP); Osamu Kawatoko, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 176 days.

(21) Appl. No.: 15/820,525

(22) Filed: Nov. 22, 2017

(65) Prior Publication Data
US 2018/0156640 A1 Jun. 7, 2018

(30) Foreign Application Priority Data
Dec. 5, 2016 (JP) .................................. 2016-235960

(51) Int. Cl.
*H05B 33/08* (2006.01)
*G01D 5/347* (2006.01)
*H05B 37/02* (2006.01)
*H02J 7/00* (2006.01)

(52) U.S. Cl.
CPC ........ *G01D 5/34715* (2013.01); *H02J 7/0063* (2013.01); *H05B 33/0842* (2013.01); *H05B 37/0281* (2013.01)

(58) Field of Classification Search
CPC .................. H05B 33/0842; H05B 33/0815
See application file for complete search history.

(56) References Cited

U.S. PATENT DOCUMENTS

| | | | |
|---|---|---|---|
| 7,608,813 B1 | 10/2009 | Milvich et al. | |
| 8,309,906 B2 | 11/2012 | Kapner et al. | |
| 2003/0117088 A1* | 6/2003 | Tanabe | H05B 33/0815 315/291 |
| 2004/0240602 A1* | 12/2004 | Kim | G01D 5/28 377/16 |
| 2010/0019693 A1* | 1/2010 | Hoogzaad | H05B 33/0815 315/294 |
| 2014/0084890 A1* | 3/2014 | Philip | H02M 1/146 323/284 |
| 2016/0072401 A1* | 3/2016 | Onishi | H01L 23/24 363/55 |
| 2017/0033684 A1* | 2/2017 | Kawamoto | H02M 3/073 |

* cited by examiner

*Primary Examiner* — Thanh Luu
(74) *Attorney, Agent, or Firm* — Greenblum & Bernstein, P.L.C.

(57) ABSTRACT

An encoder includes a light source. A booster circuit boosts a power supply voltage output by a battery, and outputs the boosted voltage. The voltage is applied to one end of a light-emitting diode. A driver circuit is inserted between another end of the light-emitting diode and a ground, the driver circuit controlling current flowing through the light-emitting diode. A voltage detector circuit detects a voltage between the light-emitting diode and the driver circuit. A control circuit causes the booster circuit to boost the power supply voltage when the voltage is lower than the power supply voltage; stops the boosting performed by the booster circuit when the voltage is equal to the power supply voltage; and controls the driver circuit such that, after the voltage reaches a predetermined value, current flows to the light-emitting diode.

16 Claims, 8 Drawing Sheets

ENCODER AND LIGHT SOURCE OF ENCODER

CROSS-REFERENCE TO RELATED APPLICATIONS

The present application claims priority under 35 U.S.C. § 119 of Japanese Application No. 2016-235960, filed on Dec. 5, 2016, the disclosure of which is expressly incorporated by reference herein in its entirety.

BACKGROUND OF THE INVENTION

1. Field of the Invention

The present invention relates to an encoder and a light source of an encoder.

2. Description of Related Art

An encoder is installed in displacement measurement devices such as a dial gauge or indicator in order to measure an amount of displacement. A known example of such an encoder is an optical encoder that uses optical interference to measure the amount of displacement. Furthermore, encoders are broadly separated into incremental encoders, which measure a relative amount of displacement, and absolute encoders, which detect an absolute position. The specifications of U.S. Pat. Nos. 7,608,813 and 8,309,906, for example, suggest configurations for an absolute-type optical encoder.

In a hand tool-type displacement measurement device, a small, lightweight coin cell or button cell is used as a power source of the optical encoder. In such a displacement measurement device, life of a battery can preferably be extended as long as possible.

However, an incremental encoder can only measure an amount of relative displacement, and therefore must continuously measure the amount of displacement. Therefore, a light source of the optical encoder must be illuminated at all times, which unfortunately results in significant electricity consumption. In contrast, absolute encoders can detect an absolute position. Therefore, illuminating the light source intermittently, only when detecting the position, is sufficient and electricity consumption can be reduced.

In optical encoders, a light-emitting element such as a light-emitting diode, for example, may be used as the light source. Forward voltage required for the light-emitting diode to emit light is around 1.6 to 4 V. In contrast, typically, nominal voltage is set by a battery and in the case of a coin cell, for example, the nominal voltage is typically 3 V. However, output voltage of the battery is at its highest when use of the battery is initiated, and the output voltage decreases as it is consumed. In general, when the output voltage of such a battery falls to a certain voltage level, the battery thereafter exhibits discharge characteristics which decline precipitously. For example, when using a coin-type lithium battery, although the nominal voltage is 3 V, when the output voltage falls to 2.5 to 2.7 V, the output voltage thereafter declines precipitously.

When a power supply voltage output by the battery can be detected with favorable accuracy, the battery can be used as a power supply until the power supply voltage falls to 2.7 V. However, because this requires a highly accurate voltage detector circuit, when providing such a voltage detector circuit is impossible, operations of the encoder must be guaranteed up to the point where the power supply voltage falls to 2.5 V. However, due to the forward voltage of the light-emitting diode, a situation may arise where the power supply voltage does not reach the forward voltage of the light-emitting diode and driving the light-emitting diode is impossible.

Therefore, a common practice is to boost the power supply voltage and apply the resulting voltage to the light-emitting diode. For example, it is conceivable to perform the boost using a DC-DC converter, but a DC-DC converter consumes a comparatively large amount of electricity, and therefore may shorten the life of the battery. In other words, using a DC-DC converter is not preferred from a standpoint of inhibiting electricity consumption.

When using boosted voltage, a site where the voltage is higher than the power supply voltage may develop in a circuit containing the light source, and the boosted voltage may exceed a withstand voltage of a circuit peripheral to the battery, or back-flow of electric current to the battery may occur. When the battery is a primary battery, back-flow of electric current to the battery may damage the battery.

SUMMARY OF THE INVENTION

The present invention was conceived in light of the circumstances above, and the present invention prevents back-flow of electric current to a battery and protects a driver circuit of a light-emitting diode even when a voltage greater than a power supply voltage is applied to a light-emitting diode in a light source of an encoder.

An encoder according to one aspect of the present invention includes a light source, a scale receiving light from the light source, a photoreceiver receiving the light from the scale and outputting a signal corresponding to the received light, and a signal processor calculating a positional relationship between the photoreceiver and the scale in accordance with the signal from the photoreceiver. The light source includes: a battery; a booster circuit boosting a power supply voltage output by the battery, and outputting the boosted voltage; a light-emitting element, to one end of which is applied the boosted voltage; a driver circuit inserted between another end of the light-emitting element and a ground, the driver circuit controlling current flowing through the light-emitting element; a voltage detector circuit detecting a voltage between the light-emitting element and the driver circuit; and a control circuit. The control circuit causes the booster circuit to boost the power supply voltage when the voltage detected by the voltage detector circuit is lower than the power supply voltage; stops the boosting performed by the booster circuit when the voltage detected by the voltage detector circuit is equal to the power supply voltage; and controls the driver circuit such that, after the boosted voltage applied to the light-emitting element reaches a predetermined value, current flows to the light-emitting element. Accordingly, when the voltage after a voltage drop in the light-emitting element reaches the power supply voltage, boosting of the voltage applied to the light-emitting element stops. Thus, the voltage after a voltage drop in the light-emitting element does not exceed the power supply voltage, and therefore the driver circuit can be protected from overvoltage and back-flow of electric current to the battery can be prevented.

An encoder according to another aspect of the present invention is the encoder described above, in which the voltage detector circuit preferably is configured as an analog/digital converter where the voltage between the light-emitting element and the driver circuit is input, the input voltage is converted to a digital signal, and the converted digital signal is output to the control circuit; and the control circuit preferably controls the boosting performed by the booster circuit in accordance with a value of the digital signal. Thus, by referencing an output signal of the analog/digital converter, the control circuit can detect whether the voltage after a voltage drop in the light-emitting element reaches the power supply voltage.

An encoder according to another aspect of the present invention is the encoder described above, in which the voltage detector circuit preferably is configured as a comparator comparing the power supply voltage applied to one input terminal with the voltage applied to another input terminal, between the light-emitting element and the driver circuit, and outputting a comparison result to the control circuit; and the control circuit preferably controls the boosting performed by the booster circuit in accordance with the comparison results. Accordingly, the output signal of the comparator is transitioned, and thereby the control circuit can detect that the voltage after a voltage drop in the light-emitting element reaches the power supply voltage.

An encoder according to another aspect of the present invention is the encoder described above, in which the booster circuit preferably includes a first diode, to an anode of which is applied the power supply voltage; a first capacitor, one end of which is connected to the ground; a second diode, an anode of which is connected to a cathode of the first diode, and a cathode of which is connected to a high potential-side end of the light-emitting element and to another end of the first capacitor; and a second capacitor, one end of which is connected to the control circuit, and another end of which is connected to the cathode of the first diode and to the anode of the second diode. Preferably, when the power supply voltage is boosted by the booster circuit, the control circuit inputs a pulse signal to the second capacitor. Thereby, the control signal can be input as a pulse signal and the voltage applied to the light-emitting element can be boosted in stepwise fashion.

An encoder according to another aspect of the present invention is the encoder described above, in which a capacity value of the first capacitor is preferably higher than the capacity value of the second capacitor. Thereby, the voltage applied to the light-emitting element can be boosted in stepwise fashion at an amount of increase that is smaller than the power supply voltage.

An encoder according to another aspect of the present invention is the encoder described above preferably provided with a third capacitor inserted between two ends of the battery, and where the capacity value of the third capacitor is preferably higher than the capacity value of the first capacitor and the capacity value of the second capacitor. Thereby, variation in the power supply voltage during boosting of the voltage applied to the light-emitting element can be inhibited.

An encoder according to another aspect of the present invention is the encoder described above, in which the driver circuit preferably includes a switch, current source, and first transistor provided in a cascaded connection between the battery and the ground; and a second transistor where the voltage between the light-emitting element and the driver circuit is applied to one end of the second transistor, another end is connected to the ground, and the second transistor configures, with the first transistor, a current mirror. Opening and closing of the switch is preferably controlled by the control circuit. Thereby, timing at which current flows to the light-emitting element can be controlled in response to a signal sent to the switch from a control signal.

An encoder according to another aspect of the present invention is the encoder described above, preferably including a third diode where the voltage between the light-emitting element and the driver circuit is applied to an anode of the third diode, and a cathode is connected between the battery and the switch, current source, and first transistor. Thereby, when the voltage after a voltage drop in the light-emitting element becomes excessively large, it is possible to prevent applying overvoltage to the driver circuit.

A light source of an encoder according to another aspect of the present invention is a light source of an encoder including a scale receiving light, a photoreceiver receiving the light from the scale and outputting a signal corresponding to the received light, and a signal processor calculating a positional relationship between the photoreceiver and the scale in accordance with the signal from the photoreceiver, the encoder emitting the light at the scale of the encoder. The light source includes: a battery; a booster circuit boosting a power supply voltage output by the battery, and outputting the boosted voltage; a light-emitting element, to one end of which is applied the boosted voltage; a driver circuit inserted between another end of the light-emitting element and a ground, the driver circuit controlling current flowing through the light-emitting element; a voltage detector circuit detecting a voltage between the light-emitting element and the driver circuit; and a control circuit. The control circuit causes the booster circuit to boost the power supply voltage when the voltage detected by the voltage detector circuit is lower than the power supply voltage; stops the boosting performed by the booster circuit when the voltage detected by the voltage detector circuit is equal to the power supply voltage; and controls the driver circuit such that, after the boosted voltage applied to the light-emitting element reaches a predetermined value, current flows to the light-emitting element. Accordingly, when the voltage after a voltage drop in the light-emitting element reaches the power supply voltage, boosting of the voltage applied to the light-emitting element stops. Thus, the voltage after a voltage drop in the light-emitting element does not exceed the power supply voltage, and therefore the driver circuit can be protected from overvoltage and back-flow of electric current to the battery can be prevented.

A light source of an encoder according to another aspect of the present invention is the light source of the encoder described above, in which the voltage detector circuit is configured as an analog/digital converter where the voltage between the light-emitting element and the driver circuit is input, the input voltage is converted to a digital signal, and the converted digital signal is output to the control circuit; and the control circuit controls the boosting performed by the booster circuit in accordance with a value of the digital signal. Thus, by referencing an output signal of the analog/digital converter, the control circuit can detect whether the voltage after a voltage drop in the light-emitting element reaches the power supply voltage.

A light source of an encoder according to another aspect of the present invention is the light source of the encoder described above, in which the voltage detector circuit is configured as a comparator comparing the power supply voltage applied to one input terminal with the voltage applied to another input terminal, between the light-emitting element and the driver circuit, and outputting a comparison result to the control circuit; and the control circuit controls the boosting performed by the booster circuit in accordance with the comparison results. Accordingly, the output signal of the comparator is transitioned, and thereby the control circuit can detect that the voltage after a voltage drop in the light-emitting element reaches the power supply voltage.

A light source of an encoder according to another aspect of the present invention is the light source of the encoder described above, in which the booster circuit includes a first diode, to an anode of which is applied the power supply voltage; a first capacitor, one end of which is connected to the ground; a second diode, an anode of which is connected to a cathode of the first diode, and a cathode of which is connected to a high potential-side end of the light-emitting element and to another end of the first capacitor; and a second capacitor, one end of which is connected to the control circuit, and another end of which is connected to the cathode of the first diode and to the anode of the second diode. When the power supply voltage is boosted by the booster circuit, the control circuit inputs a pulse signal to the second capacitor. Thereby, the control signal can be input as a pulse signal and the voltage applied to the light-emitting element can be boosted in stepwise fashion.

A light source of an encoder according to another aspect of the present invention is the light source of the encoder described above, in which a capacity value of the first capacitor is higher than the capacity value of the second capacitor. Thereby, the voltage applied to the light-emitting element can be boosted in stepwise fashion at an amount of increase that is smaller than the power supply voltage.

A light source of an encoder according to another aspect of the present invention is the light source of the encoder described above provided with a third capacitor inserted between two ends of the battery, and where the capacity value of the third capacitor is higher than the capacity value of the first capacitor and the capacity value of the second capacitor. Thereby, variation in the power supply voltage during boosting of the voltage applied to the light-emitting element can be inhibited.

A light source of an encoder according to another aspect of the present invention is the light source of the encoder described above, in which the driver circuit includes a switch, current source, and first transistor provided in a cascaded connection between the battery and the ground; and a second transistor where the voltage between the light-emitting element and the driver circuit is applied to one end of the second transistor, another end is connected to the ground, and the second transistor configures, with the first transistor, a current mirror. Opening and closing of the switch is controlled by the control circuit. Thereby, timing at which current flows to the light-emitting element can be controlled in response to a signal sent to the switch from a control signal.

A light source of an encoder according to another aspect of the present invention is the light source of the encoder described above, including a third diode where the voltage between the light-emitting element and the driver circuit is applied to an anode of the third diode, and a cathode is connected between the battery and the switch, current source, and first transistor. Thereby, when the voltage after a voltage drop in the light-emitting element becomes excessively large, it is possible to prevent applying overvoltage to the driver circuit.

According to the present invention, back-flow of electric current to a battery can be prevented and a driver circuit of a light-emitting diode can be protected even when a voltage greater than a power supply voltage is applied to the light-emitting diode in a light source of an encoder.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
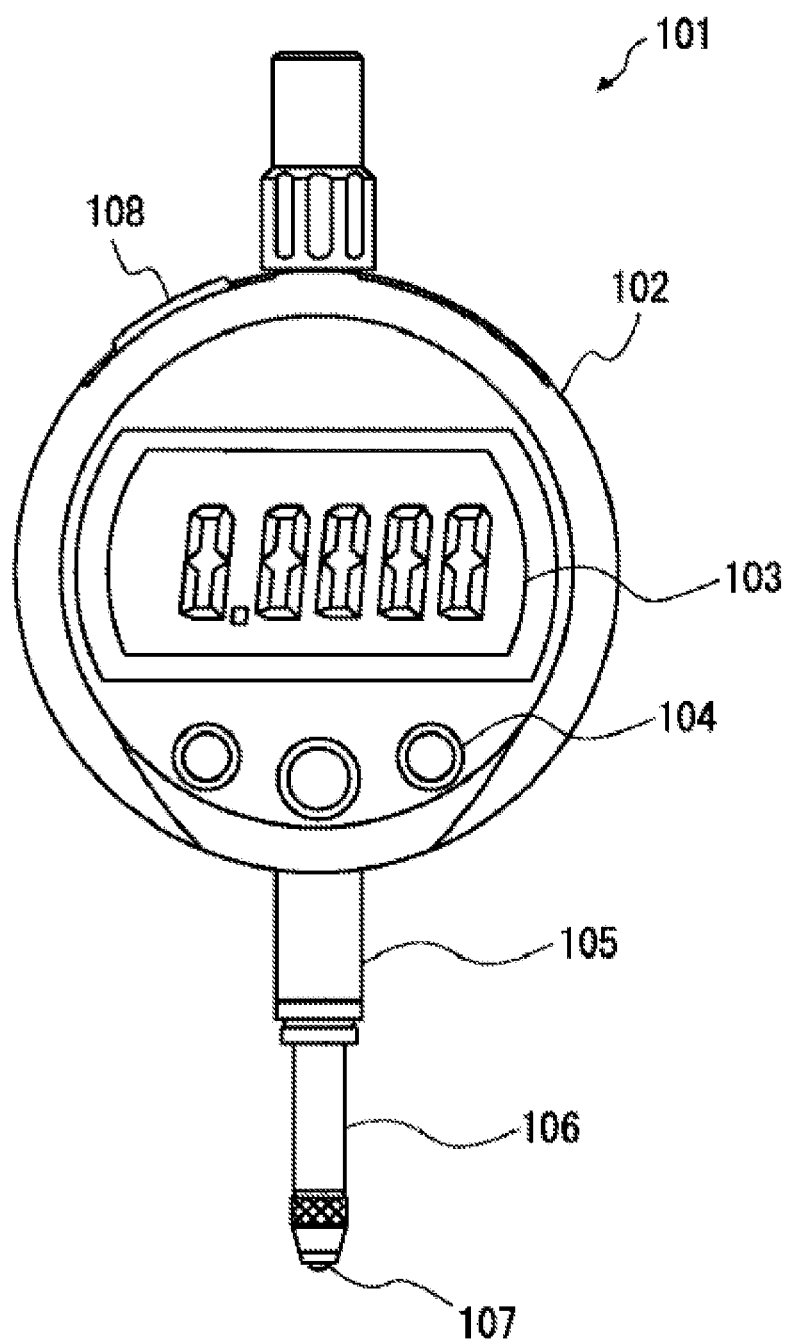
FIG. 1 is a front view schematically illustrating a configuration of a dial gauge that incorporates an optical encoder according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and duplicative descriptions are omitted where necessary.

First Embodiment

An optical encoder according to a first embodiment is described. FIG. 1 is a front view schematically illustrating a configuration of a dial gauge 101 that incorporates the optical encoder according to the first embodiment. The dial gauge 101 includes a main body 102, a display 103, an operation button 104, a stem 105, a spindle 106, a stylus head 107, and an output port 108.

The main body 102 has a substantially rounded pillar shape where the height in the vertical direction of the drawing plane of FIG. 1 is less than the width in the horizontal direction of the drawing plane of FIG. 1. The display 103 displaying a measured value, for example, is provided on one surface of the main body 102.

The stem 105 has a substantially cylindrical shape extending in the vertical direction of the drawing plane of FIG. 1, and is provided so as to project from an exterior edge of the main body 102.

The spindle 106 is a substantially cylindrical member, is inserted through the stem 105, and is supported so as to be capable of sliding in a length direction of the stem 105. The stylus head 107, which makes contact with a measured object, is joined to a forefront end of the spindle 106 projecting from the stem 105.

A displacement amount detector (not shown in the drawings) detecting an amount of displacement of the spindle 106 is provided inside the main body 102. In order to detect the amount of displacement, the displacement amount detector includes an optical encoder 10 (described below), and using the optical encoder 10, the amount of displacement of the spindle 106 is detected on a fixed cycle and output to the display 103. The display 103 is configured to be capable of displaying measurement results output from the displacement amount detector.

The operation button 104 is used to reset the measurement results displayed on the display 103, to switch a display range, or the like. In this example, three operation buttons 104 are provided, but the number of operation buttons 104 is not limited to this.

The output port 108 is configured to enable connection of an external device, and can output measurement results to an exterior, for example.

Figure 2:
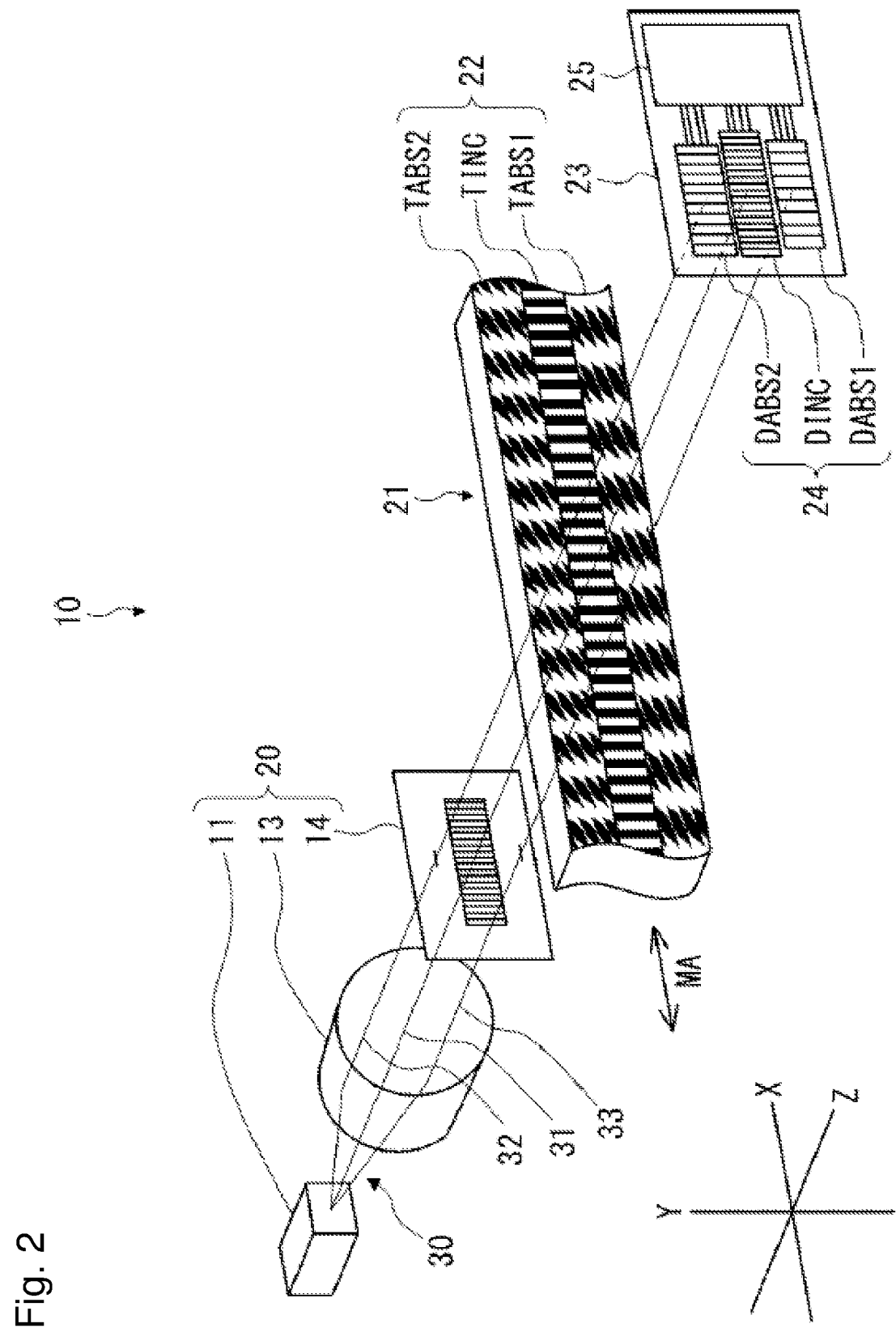
FIG. 2 is a development plan illustrating a schematic configuration of the optical encoder according to the first embodiment.

The optical encoder 10 according to the first embodiment is described next. In the present embodiment, the optical encoder 10 is configured as an absolute optical encoder that uses a dual-modulation scale track pattern (hereafter referred to as a DMST pattern). FIG. 2 is a development plan illustrating a schematic configuration of the optical encoder 10 according to the first embodiment. As shown in FIG. 2, the optical encoder 10 includes an illuminator 20, a scale 21, and a signal detector 23.

The illuminator 20 and the signal detector 23 are arranged so as to have fixed relative positions. The signal detector 23 and the illuminator 20 are configured to be capable of relative displacement, relative to the scale 21, along a measurement direction (X axis direction in FIG. 2), which is a length direction of the scale 21. The scale 21 is provided with an absolute scale pattern 22 used in position detection. When the illuminator 20 emits light at the absolute scale pattern 22, interference light is generated. By detecting a change in the measurement direction of the interference light, the signal detector 23 can detect a positional relationship between the scale 21 and the signal detector 23.

The illuminator 20 is configured as a component illuminating the scale 21 with a visible or non-visible wavelength. The illuminator 20 includes, for example, a light source 11, a lens 13, and a light source lattice 14. The light source 11 is configured to be capable of emitting light of a visible or non-visible wavelength. The light source 11 is connected to a signal processing circuit 25 described below, and behaves as a light source that intermittently emits light on a fixed cycle. Light 30 emitted from the light source 11 is either partially or fully converted to parallel light beams by the lens 13, so as to have a sufficient beam area for illuminating a predetermined region of the scale 21. The light source lattice 14 renders the parallel light beams from the lens 13 into uniform illuminance in the measurement direction, after which the parallel light beams reach the scale 21. In a case where an illumination distribution of the parallel light beams from the lens 13 is sufficiently uniform, an illuminator not having the light source lattice 14 may be provided.

The scale 21 includes the absolute scale pattern 22. The absolute scale pattern 22 is configured by an incremental track pattern TINC, an absolute track pattern TABS1, and an absolute track pattern TABS2. The DMST pattern named above can be used as the absolute track pattern TABS1 and as the absolute track pattern TABS2.

The plane of the scale 21 on which the absolute scale pattern 22 is formed is the plane parallel to the X direction (measurement direction) and Y direction (perpendicular to the X direction). In FIG. 2, the measurement direction is depicted with reference sign MA. In addition, in FIG. 2, the direction perpendicular to the plane of the scale 21 on which the absolute scale pattern 22 is formed, i.e., the X-Y plane, is designated as the Z direction.

The signal detector 23 includes a detector track 24 and the signal processing circuit 25. The signal detector 23 can be configured as a single complementary metal oxide semiconductor (CMOS) integrated circuit, for example. The detector track 24 includes three detector tracks DINC, DABS1, and DABS2. The detector tracks DINC, DABS1, and DABS2 are arranged so as to receive patterned light from the incremental track pattern TINC, absolute track pattern TABS1, and absolute track pattern TABS2, respectively. The signal processing circuit 25 is configured as a circuit that processes a signal indicating detection results of the detector track 24.

As noted above, the light 30 emitted from the light source 11 is converted to parallel light beams by the lens 13. In FIG. 1, three optical paths 31, 32, and 33 of the light 30 are illustrated schematically. The optical path 31 is a representative central optical path that includes light illuminating the incremental track pattern TINC. The optical paths 32 and 33 are representative optical paths that include light illuminating the absolute track patterns TABS2 and TABS1, respectively.

In a case where the light source lattice 14 is used, the light source lattice 14 has a lattice structure that includes openings where the light around the representative optical path 31 is arranged at the pitch of the incremental track pattern TINC or at a pitch that largely conforms to the wavelength. The parallel light beams from the lens 13 pass through the lattice structure of the light source lattice 14 and strike the incremental track pattern TINC according to what is known as the self-imaging illumination principle.

When the incremental track pattern TINC is illuminated, a spatially modulated light pattern (for example, light in an interference fringe for the plurality of diffracted light) is output toward the detector track DINC of the signal detector 23. For example, when the track has a track wavelength of approximately 8 μm or less, the incremental track pattern TINC is configured such that the plurality of diffracted light (for example, ±1-dimensional diffracted light) generates an interference fringe on the detector track DINC. In addition, when the track has a track wavelength of approximately 8 to 40 μm, for example, the incremental track pattern TINC is configured such that several diffracted lights act on one another and a self-image (for example, a Talbot image or Fresnel image) is generated on the plane of the detector track DINC.

The absolute track patterns TABS2 and TABS1 are configured so as to generate an image (for example, a blurry or non-blurry image) projected onto the detector tracks DABS2 and DABS1, respectively. When the absolute track pattern TABS1 is illuminated, a spatially modulated light pattern (for example, patterned light corresponding to the absolute track pattern TABS1) is output toward the detector track DABS1 of the signal detector 23. When the absolute track pattern TABS2 is illuminated, a spatially modulated light pattern (for example, patterned light corresponding to the absolute track pattern TABS2) is output toward the detector track DABS2 of the signal detector 23.

The spatially modulated light pattern displaces together with the scale 21. In order to obtain a desired detection signal with each of the detector tracks DINC, DABS1, and DABS2, a plurality of light detector regions are arrayed, for example, such that the spatially modulated light pattern can be spatially filtered and detected. The plurality of detector regions may be configured by arraying the plurality of light detectors in the measurement direction, or may be achieved by causing light to strike a light detector having a large surface area through a spatial filter mask provided with a plurality of openings in the measurement direction.

The configuration of the track patterns depicted in FIG. 2 are merely exemplary, and so long as the pattern can be detected by the detector track, other configurations and arrangements can, of course, be employed.

Figure 3:
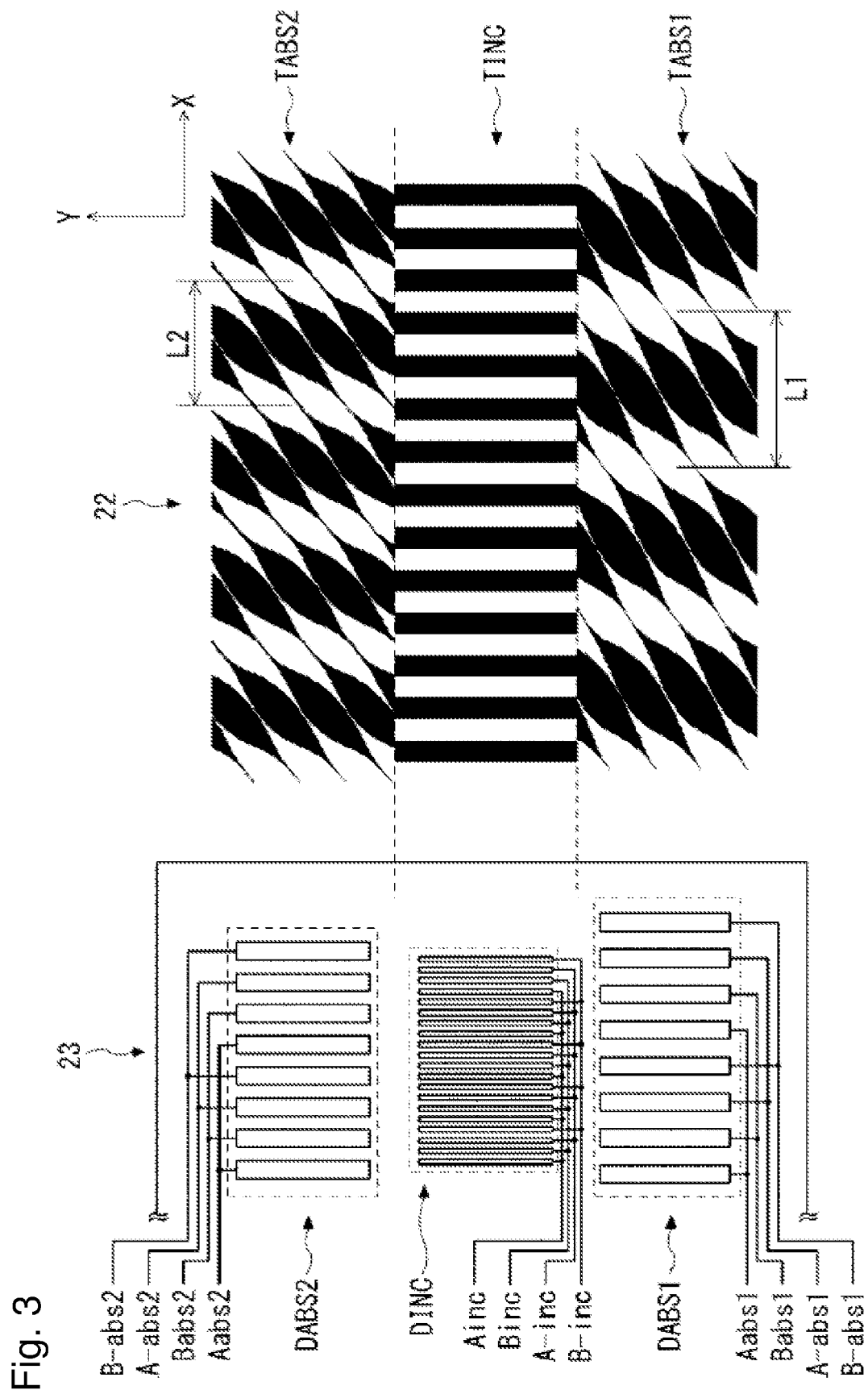
FIG. 3 illustrates a configuration of an absolute scale pattern and a signal detector.

Next, a more detailed description of the absolute scale pattern 22 and the signal detector 23 follow. FIG. 3 illustrates the configurations of the absolute scale pattern 22 and the signal detector 23. To facilitate the description, in FIG. 3, the signal detector 23 and absolute scale pattern 22 are depicted alongside each other, viewing the X-Y plane along the Z direction.

In FIG. 3, the spatial wavelength of the absolute track pattern TABS1 is L1 and the spatial wavelength of the absolute track pattern TAB S2 is L2. The absolute track pattern TABS1 and the absolute track pattern TABS2 are provided with a pattern that is transparent to (or reflects) a light pattern that is spatially modulated for intensity. Such a pattern is configured such that a Y-direction width (cross-sectional dimension) changes as a function of a position along the measurement direction MA (X direction).

Each of the detector tracks DINC, DABS1, and DABS2 have a plurality of light detectors arranged so as to configure a quadrature detector, for example. In this example, each of the detector tracks have four adjacent detector elements arranged at equal intervals so as to create a spatial filter detecting four spatial phases (specifically, 0°, 90°, 180°, and 270°) of the spatially modulated light pattern received. A plurality of groups of four adjacent detector elements arranged in this way are provided and, as shown in FIG. 3, signals from the plurality of groups and associated with each of the spatial phases are added up. The totaled signals are indicated using four symbols: A (0°), B (90°), A-(180°), and B-(270°). Specifically, the four quadrature signals corresponding to the detector track DINC are designated as signals Ainc, Binc, A-inc, and B-inc. Similarly, the four quadrature signals of the detector track DABS1 are designated as signals Aabs1, Babs1, A-abs1, and B-abs1, and the four quadrature signals of the detector track DABS2 are designated as signals B-abs2, A-abs2, Babs2, and Aabs2.

The quadrature signals are processed so as to determine a spatial phase position of each track within a current local wavelength of the corresponding scale track. In particular, when at least one of the absolute track pattern TABS1 and the absolute track pattern TABS2 is a DMST pattern that includes a characteristic imparting a spatially modulated light pattern that includes an intensity modulation component, signals are obtained that correspond to the four spatial phases (i.e., 0°, 90°, 180°, and 270°) of the intensity modulation component.

By performing signal processing similar to that in the specification of U.S. Pat. No. 8,309,906, for example, on the quadrature signals derived from the absolute track pattern TABS1 (wavelength L1) and the absolute track pattern TABS2 (wavelength L2), a composite wavelength position signal can be obtained that varies periodically by a composite wavelength S.

$$S = L1 \times L2 / |L1 - L2|$$

Also, again similarly to the specification of U.S. Pat. No. 8,309,906, a broad range position signal can be obtained that exhibits variation having a longer periodicity than, or that is gentler than, the composite wavelength S. Given the above, by combining the broad range position signal and the composite wavelength signal, an absolute position can be exactingly measured.

In one example, the total width of the absolute scale pattern 22 can be set to approximately 3.0 mm or less. The wavelength L2 of the absolute track pattern TABS2 can be set to L2=720 µm, and the wavelength L1 of the absolute track pattern TABS1 can be set to L1=700 µm. The wavelength of the incremental track pattern TINC can be set to 20 µm. According to the specification of U.S. Pat. No. 8,309,906, a composite wavelength of approximately 25.2 mm can thus be obtained. The configurations and dimensions given in the preceding case are merely exemplary, and the present invention is not limited to these.

Figure 4:
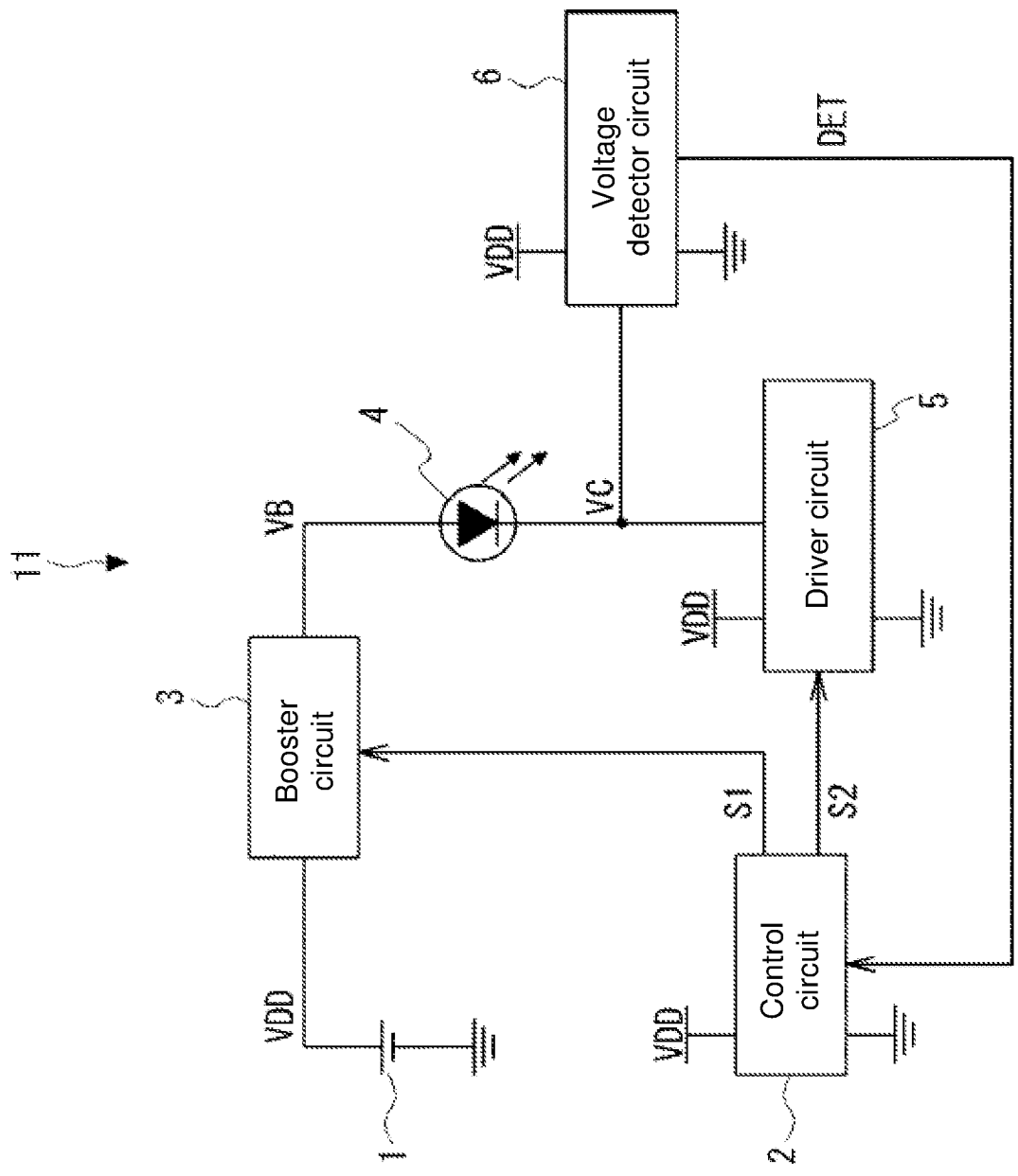
FIG. 4 schematically illustrates a configuration of a light source according to the first embodiment.

Next, a description is given of the light source 11 according to the first embodiment. FIG. 4 schematically illustrates a configuration of the light source 11 according to the first embodiment. As shown in FIG. 4, the light source 11 according to the first embodiment includes a battery 1, a control circuit 2, a booster circuit 3, a light-emitting diode 4, a driver circuit 5, and a voltage detector circuit 6.

The battery 1 is a primary battery, for which a coin cell or button cell having a nominal voltage of 3 V, for example, can be used. In this example, "coin cell or button cell" indicates a primary battery having a disc-like shape and may refer to, for example, a graphite fluoride lithium battery, a manganese dioxide lithium battery, a copper oxide lithium battery, an alkaline battery, a mercury battery, a zinc-air battery, a silver oxide battery, and the like.

The control circuit 2 controls operations of the booster circuit 3 and the driver circuit 5 based on a voltage detection result obtained by the voltage detector circuit 6. In this example, the control circuit 2 controls the booster circuit 3 with a control signal S1 and controls the driver circuit 5 with a control signal S2.

The booster circuit 3 boosts to a predetermined voltage a voltage VB that is applied to an anode of the light-emitting diode 4.

The light-emitting diode 4 has the anode connected to an output of the booster circuit 3 and a cathode connected to the driver circuit 5. In this example, a light-emitting diode is used as a light-emitting element, but the present invention is not limited to this example. Specifically, other types of elements such as a semiconductor laser, a self-scanning light-emitting device (SLED), or an organic light-emitting diode (OLED) may also be used as the light-emitting element.

The drive circuit 5 drives the light-emitting diode 4 by controlling the current flowing to the light-emitting diode 4.

The voltage detector circuit 6 detects a voltage VC of the cathode of the light-emitting diode 4. In other words, the voltage detector circuit 6 detects the voltage VC that is input to the driver circuit 5 from the cathode of the light-emitting diode 4, or detects the voltage VC of a node between the cathode of the light-emitting diode 4 and the driver circuit 5.

Then, the voltage detector circuit 6 outputs detection results of the detected voltage VC to the control circuit 2 as a detection signal DET.

Figure 5:
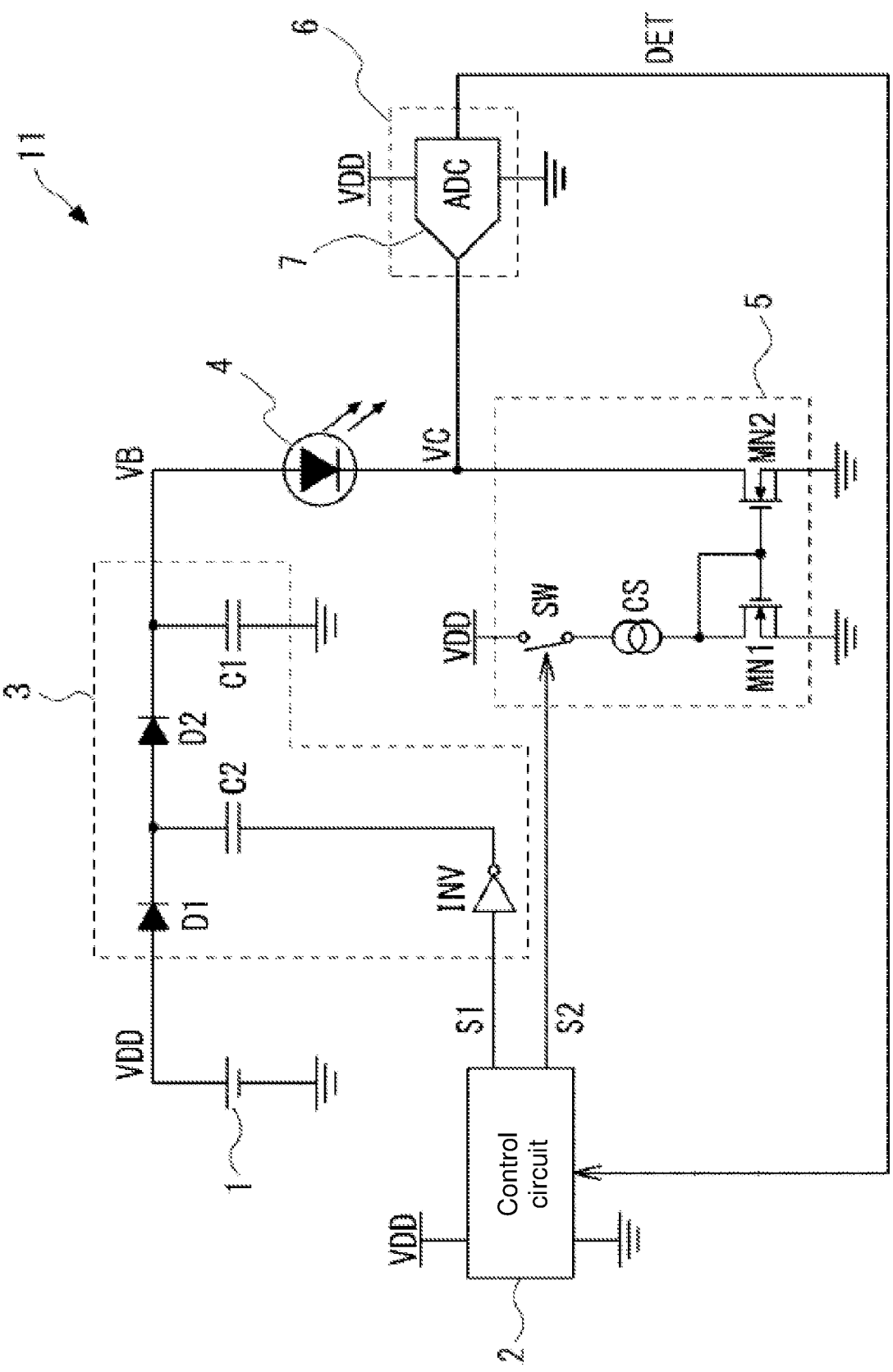
FIG. 5 illustrates an exemplary configuration of the light source according to the first embodiment.

A description of a specific configuration of the voltage detector circuit 6 is now given. FIG. 5 illustrates an exemplary configuration of the light source 11 according to the first embodiment. As shown in FIG. 5, the voltage detector circuit 6 is configured as an analog/digital converter (hereafter, ADC), which is an analog/digital conversion device that receives power supply from the battery 1. In this case, the ADC 7 converts the voltage VC (input analog signal) to the detection signal DET (digital signal) and outputs the signal to the control circuit 2. By referencing the value of the detection signal DET, the control circuit 2 can judge whether the voltage VC has reached a power supply voltage VDD.

Figure 6:
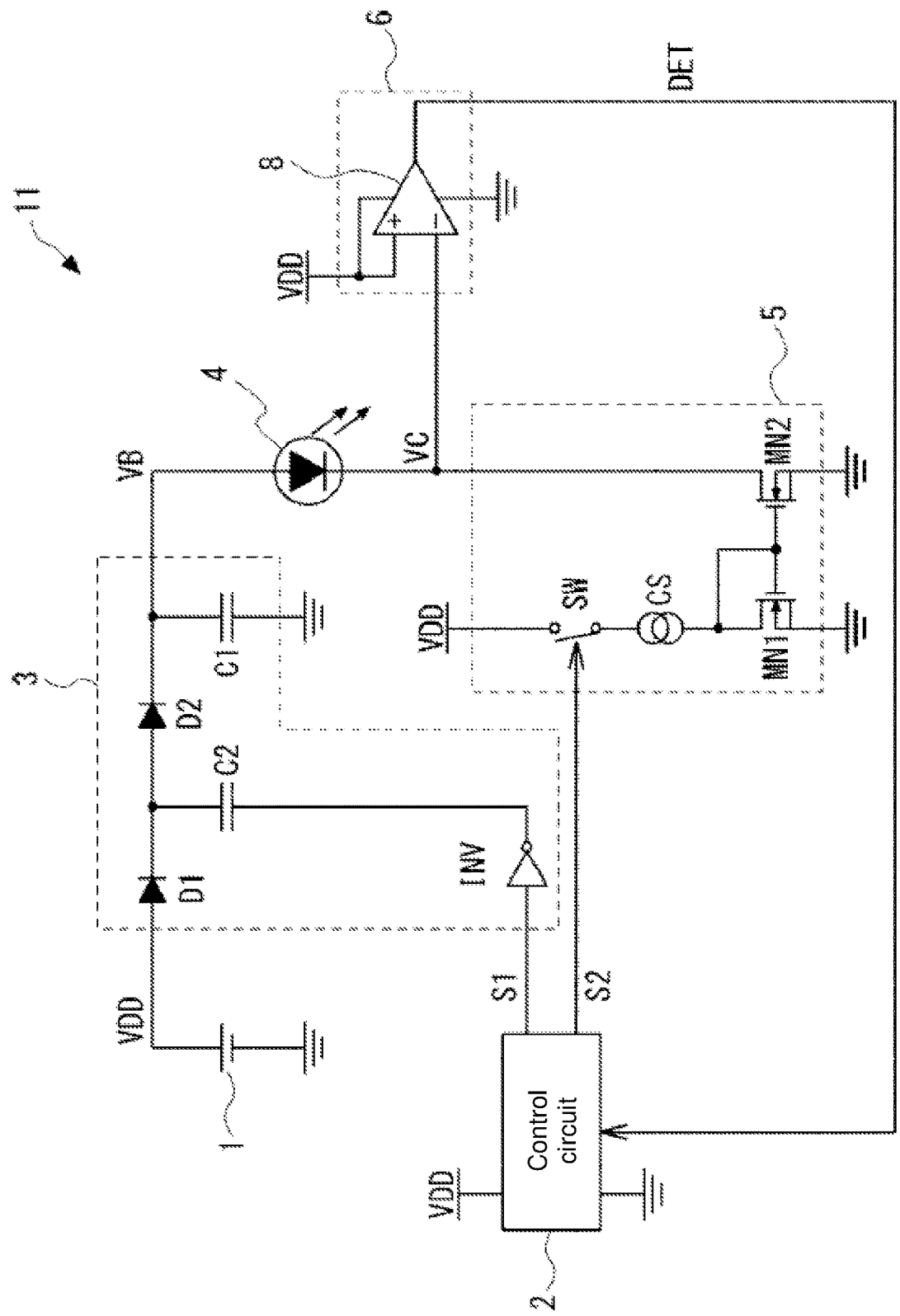
FIG. 6 illustrates another exemplary configuration of the light source according to the first embodiment.

The specific configuration of the voltage detector circuit 6 is further described. FIG. 6 illustrates another exemplary configuration of the light source 11 according to the first embodiment. As shown in FIG. 6, the voltage detector circuit 6 may instead be configured as a comparator 8 comparing the power supply voltage VDD and the voltage VC. In this example, the power supply voltage VDD is input to a non-inverting input terminal of the comparator 8, and the voltage VC is input to an inverting input terminal. In such a case, when the voltage VC reaches the power supply voltage VDD, a voltage level of the detection signal DET output by the comparator transitions from HIGH to LOW. Accordingly, by referencing the voltage of the detection signal DET, the control circuit 2 can judge whether the voltage VC has reached the power supply voltage VDD.

As described above, in the case of a coin cell, for example, whereas the nominal voltage is typically 3 V and actual output voltage is 2.5 to 2.7 V, forward voltage of the light-emitting diode is about 1.6 to 4 V. In view of this, in the present configuration, the power supply voltage VDD is boosted by the booster circuit 3 and the forward voltage of the light-emitting diode 4 is ensured. However, when the voltage after boosting is too high, a voltage exceeding the withstand voltage may be applied to the circuit elements configuring the light source 11 (e.g., the driver circuit 5), which may lead to circuit failure. In addition, a voltage greater than the output voltage of the battery 1 may be generated in the light source 11, which may cause back-flow of electric current to the battery 1 (primary battery).

Accordingly, in the present configuration, the power supply voltage VDD is used as a reference voltage to be compared to the voltage VC in the voltage detector circuit 6. Thus, when the voltage detector circuit 6 detects that the voltage VC has reached the power supply voltage VDD, a rise in the voltage VC can be limited by the control circuit 2 stopping voltage boosting performed by the booster circuit 3, and application to the driver circuit 5 of a voltage in excess of the withstand voltage can be prevented. In addition, no voltage greater than the power supply voltage VDD is applied to the driver circuit 5, and therefore back-flow of electric current to the battery 1 can be prevented and damage to the battery 1 can be avoided.

Next, the booster circuit 3 is described in further detail. As shown in FIGS. 5 and 6, the booster circuit 3 includes an inverter INV, a diode D1 (also called a first diode) and diode D2 (also called a second diode), and a capacitor C1 (also called a first capacitor) and capacitor C2 (also called a second capacitor).

An anode of the diode D1 is connected to a high potential-side terminal of the battery 1, and the power supply voltage VDD is applied thereto. A cathode of the diode D1 is connected to an anode of the diode D2. The inverter INV outputs a signal which is the inversion of the control signal S1 output from the control circuit 2. The capacitor C2 is inserted between the output of the inverter INV, and the cathode of the diode D1 and the anode of the diode D2. A cathode of the diode D2 is connected to an anode of the light-emitting diode 4. In addition, the capacitor C1 is inserted between the cathode of the diode D2 and a ground.

In the booster circuit 3, in order to perform boosting accurately, a capacity value of the capacitor C2 is preferably lower than the capacity value of the capacitor C1. For example, the capacity value of the capacitor C2 is preferably about ⅒th of the capacity value of the capacitor C1. In this case, preferably, the capacity value of the capacitor C1 is taken as 1.0 µF and the capacity value of the capacitor C2 is taken as 0.1 µF, for example.

Next, the driver circuit 5 is described in further detail. FIGS. 5 and 6 provide circuit diagrams schematically illustrating exemplary configurations of the driver circuit 5. The driver circuit 5 includes a switch SW, a current source CS, and NMOS transistors MN1 and MN2.

The switch SW, the current source CS, and the NMOS transistor MN1 are placed in a cascaded connection between the power supply voltage VDD and a ground. Specifically, the power supply voltage VDD is applied to one end of the switch SW. The current source CS is inserted between another end of the switch SW and a drain of the NMOS transistor MN1. A source of the NMOS transistor MN1 is connected to the ground. Opening and closing of the switch SW is controlled by the control signal S2 from the control circuit 2.

A drain of the NMOS transistor MN2 is connected to the cathode of the light-emitting diode 4. A source of the NMOS transistor MN2 is connected to a ground.

With this configuration, the NMOS transistor MN1 and the NMOS transistor MN2 configure a current mirror. Specifically, a gate of the NMOS transistor MN1 and a gate of the NMOS transistor MN2 are connected to the drain of the NMOS transistor MN1. Accordingly, the current flowing to the NMOS transistor MN1 is copied at a predetermined ratio and the copied current flows to the NMOS transistor MN2. At this point, when the NMOS transistor MN1 and the NMOS transistor MN2 are transistors having identical specifications, the current flowing to the NMOS transistor MN2 becomes equal to the current flowing to the NMOS transistor MN1.

In this example, the voltage detector circuit 6 detects the voltage between the light-emitting diode 4 and the drain of the NMOS transistor MN2.

Figure 7:
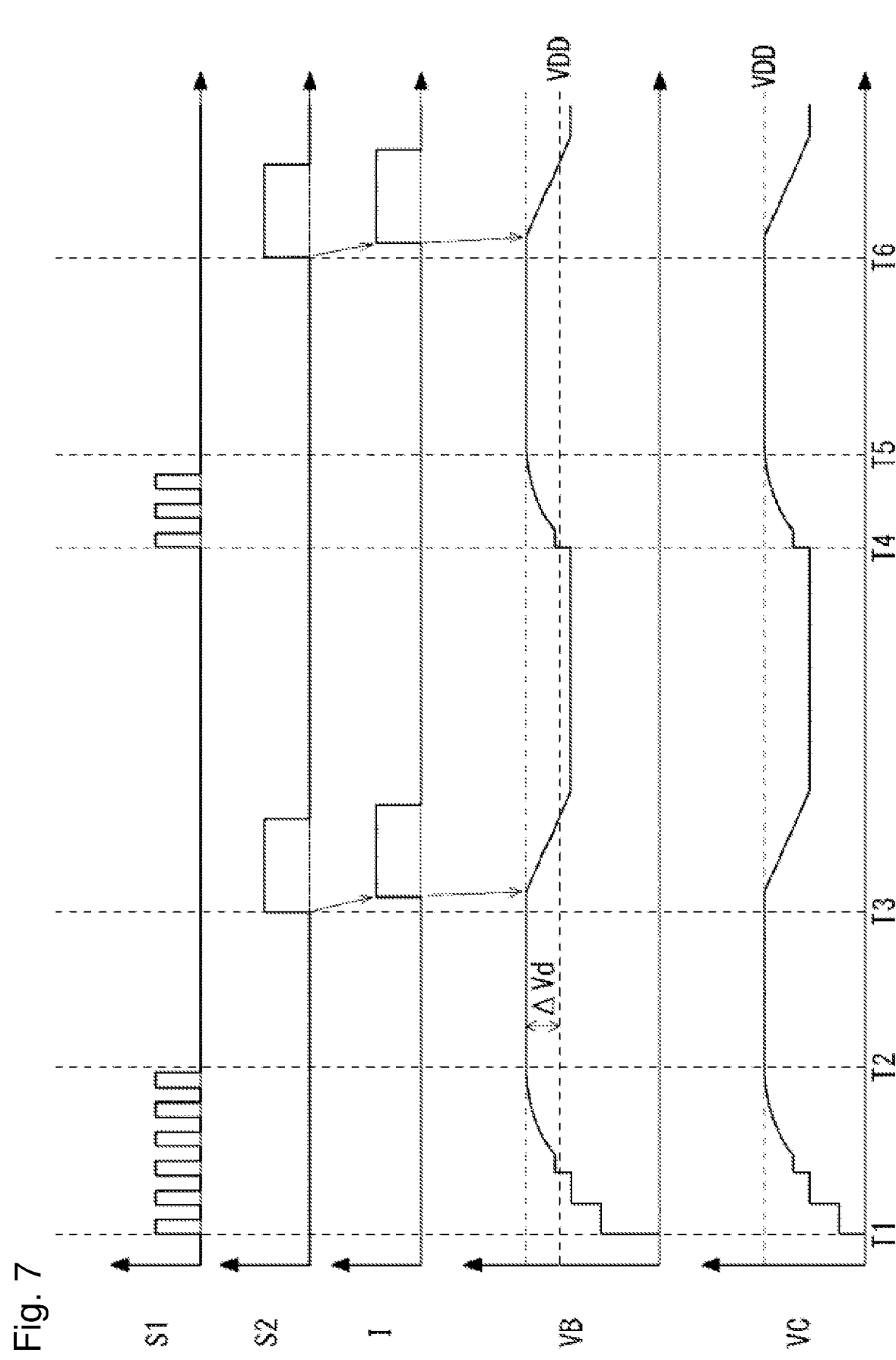
FIG. 7 is a timing chart illustrating operations of the light source according to the first embodiment.

Next, operations of the light source 11 are described. FIG. 7 is a timing chart illustrating operations of the light source 11 according to the first embodiment. First, in an initial state, the control signal S2 is LOW and the switch SW is open. Thus, current I does not flow to the light-emitting diode 4 and the light-emitting diode 4 does not emit any light. In this state, the control circuit 2 outputs a pulse signal as the control signal S1. At this point, each time HIGH is input to the capacitor C2 through the inverter INV, the capacitor C2 is charged, and in conjunction with this the load charged to the capacitor C1 also increases. The control signal S1 is a pulse signal, and therefore each time a pulse is input to the capacitor C2, the load charged to the capacitor C1 increases in stepwise fashion. Accordingly, the voltage VB of the anode of the light-emitting diode 4 also increases in conjunction with this.

Here, an example is given where the power supply voltage VDD is 2.5 V and the booster circuit 3 can boost the power supply voltage up to approximately twice as much. At this point, when a voltage drop due to the diodes D1 and D2 is estimated to be 0.4 V, the voltage VB can be boosted up to 2×VDD−0.4=4.6 V. As noted above, in this example, when the voltage drop in the light-emitting diode 4 is taken to be 1.6 to 4.0 V, the voltage VC is likely to be in a range of 0.6 to 3 V. That is, due to the value of the voltage VB and the voltage drop in the light-emitting diode 4, the voltage VC may exceed the power supply voltage VDD (2.5 V), or a situation may arise where the voltage is boosted to the withstand voltage of the driver circuit 5.

In the present configuration, during the operations described above, the voltage detector circuit 6 monitors the voltage VC of the cathode of the light-emitting diode 4. Specifically, the voltage detector circuit 6 detects whether the voltage VC of the cathode of the light-emitting diode 4 exceeds the power supply voltage VDD. When the voltage VC has reached the power supply voltage VDD, the voltage detector circuit 6 notifies the control circuit 2 using the detection signal DET. In response to the detection signal DET, the control circuit 2 halts output of the control signal S1 at the point in time where the voltage VC reaches the power supply voltage VDD, and halts boosting of the voltage VB.

At this point, the voltage VB becomes significantly greater than the power supply voltage VDD, and the control circuit 2 transitions the level of the control signal S2 from LOW to HIGH and closes the switch SW. Thereby, current flows to the light-emitting diode 4 and the light-emitting diode 4 emits light. As current flows to the light-emitting diode 4, the boosted amount of load that was charged to the capacitor C1 decreases, and therefore the voltage VB of the anode of the light-emitting diode 4 drops.

After a predetermined amount of time elapses, the control circuit 2 transitions the level of the control signal S2 from HIGH to LOW and opens the switch SW. Accordingly, the current flowing to the light-emitting diode 4 is interrupted and the light-emitting diode 4 stops emitting light.

In the foregoing description, the control circuit 2 switches the level of the control signal S2 as appropriate, and drives the light-emitting diode 4 while keeping the voltage VB within a predetermined range, and thereby the control circuit 2 can cause the light-emitting diode 4 to emit light stably.

Thereafter, by repeating the output of the pulse-like control signal S1, the halting, and the transition to the control signal S2, the control circuit 2 can cause the light-emitting diode 4 to emit light intermittently.

From the above description, it can be understood that, with the present configuration, the voltage VC can be prevented from becoming greater than the power supply voltage VDD. Accordingly, it is possible to prevent application to the driver circuit of a voltage that exceeds the withstand voltage, and to prevent back-flow of electric current to the battery 1.

In addition, as noted above, the voltage detector circuit 6 can be configured using an ordinary ADC or comparator, and therefore can be configured on the same chip to which other circuits, such as the driver circuit 5, are mounted. Thus, the voltage detector circuit 6 can be equipped without preparing any special chip or the like, and can be introduced at a low cost. Also, because the voltage detector circuit 6 can be placed on the same chip with other circuits, the encoder can be reduced in size, which is useful.

Second Embodiment

Figure 8:
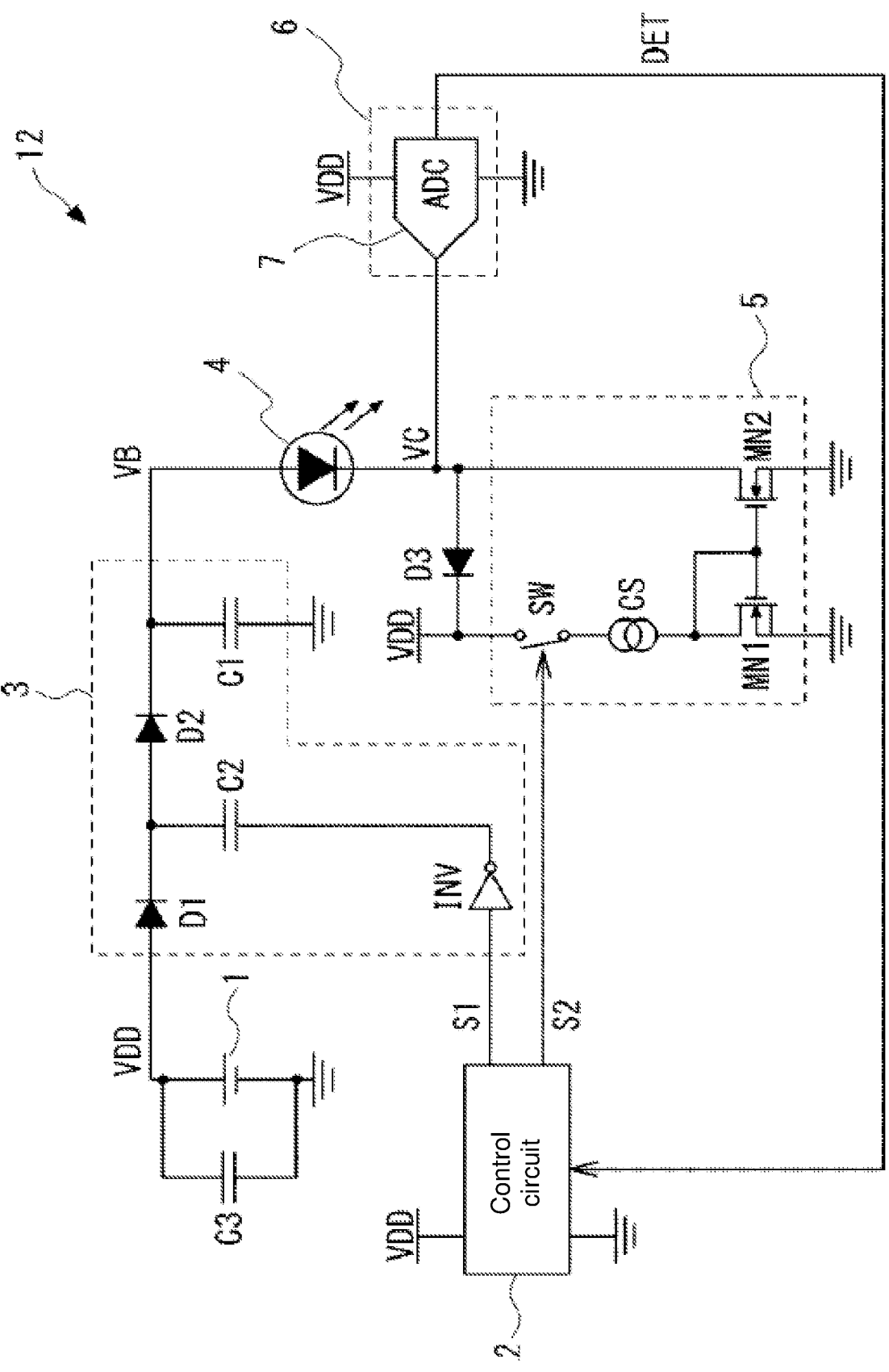
FIG. 8 schematically illustrates a configuration of a light source according to a second embodiment.

A description is given of a light source 12 according to a second embodiment. FIG. 8 schematically illustrates a configuration of the light source 12 according to the second embodiment. The light source 12 has a configuration in which a capacitor C3 (also called a third capacitor) and a diode D3 (also called a third diode) are added to the light source 11 according to the first embodiment.

The capacitor C3 is connected to the high potential-side terminal of the battery 1, and another end is connected to a ground. In this example, the capacity value of the capacitor C3 is preferably set to be higher than the capacity values of the capacitors C1 and C2. For example, the capacity value of the capacitor C1 may be taken as 1.0 µF, the capacity value of the capacitor C2 may be taken as 0.1 µF, and the capacity value of the capacitor C3 may be taken as 10 µF.

By increasing the capacity value of the capacitor C3 in this way, variation in the power supply voltage VDD during the boosting operation can be inhibited. This makes it possible to stabilize operations of the light source 12, which is useful.

An anode of the diode D3 is connected to the cathode of the light-emitting diode 4. In other words, the anode of the diode D3 may be connected to the drain of the NMOS transistor MN2 of the driver circuit 5, or may be connected to a node between the cathode of the light-emitting diode 4 and the drain of the NMOS transistor MN2 of the driver circuit 5. A cathode of the diode D3 is connected to a node between the battery 1 (power supply voltage VDD) and the switch SW of the driver circuit 5.

In the present configuration, when the voltage VC grows higher for some reason, the increase in the voltage VC can be inhibited by sending current to flow through the diode D3. Because the voltage detector circuit 6 monitors the voltage VC in the light source 12, the diode D3 is provided as a back-up for this operation. Even in a case where the current flows to the diode D3, the voltage detector circuit 6 monitors the voltage VC. Accordingly, application of a voltage greater than the power supply voltage VDD to the battery 1 through the diode D3 can be prevented. Thus, back-flow of electric current to the battery 1 (primary battery) can be prevented, and the battery 1 can be protected.

Other Embodiments

Moreover, the present invention is not limited to the embodiments described above, and may be modified as needed without departing from the scope of the present invention. For example, the driver circuit 5 and the voltage detector circuit 6 may have some other appropriate configuration.

In the embodiments given above, the driver circuit is configured using NMOS transistors, but may instead be configured using a PMOS transistor as appropriate. Moreover, the transistors used are not limited to MOS transistors, and some other type of transistor may be used instead.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An encoder, comprising:
   a light source, including:
   a battery;
   a booster circuit that boosts a power supply voltage output by the battery, and that outputs the boosted voltage;
   a light-emitting element, to one end of which is applied the boosted voltage;
   a driver circuit inserted between another end of the light-emitting element and a ground, the driver circuit controlling current flowing through the light-emitting element;
   a voltage detector circuit that detects a voltage between the light-emitting element and the driver circuit; and
   a control circuit that controls the booster circuit to boost the power supply voltage when the voltage detected by the voltage detector circuit is lower than the power supply voltage, that stops the boosting performed by the booster circuit when the voltage detected by the voltage detector circuit is equal to the power supply voltage, and that controls the driver circuit such that, after the boosted voltage applied to the light-emitting element reaches a predetermined value, current flows to the light-emitting element;
   a scale that receives light from the light source;
   a photoreceiver that receives the light from the scale and that outputs a signal corresponding to the received light; and
   a signal processor that calculates a positional relationship between the photoreceiver and the scale in accordance with the signal from the photoreceiver.

2. The encoder according to claim 1,
   wherein the voltage detector circuit is an analog/digital converter where the voltage between the light-emitting element and the driver circuit is input,
   the input voltage is converted to a digital signal,
   the converted digital signal is output to the control circuit, and
   the control circuit controls the boosting performed by the booster circuit in accordance with a value of the digital signal.

3. The encoder according to claim 1,
   wherein the voltage detector circuit is a comparator that compares the power supply voltage applied to one input terminal with the voltage applied to another input terminal, between the light-emitting element and the driver circuit, and that outputs a comparison result to the control circuit, and
   the control circuit controls the boosting performed by the booster circuit in accordance with the comparison results.

4. The encoder according to claim 1,
   wherein the booster circuit includes
   a first diode, to an anode of which the power supply voltage is applied;
   a first capacitor, one end of which is connected to the ground;
   a second diode, an anode of which is connected to a cathode of the first diode, and a cathode of which is connected to a high potential-side end of the light-emitting element and to another end of the first capacitor; and
   a second capacitor, one end of which is connected to the control circuit, and another end of which is connected to the cathode of the first diode and to the anode of the second diode, wherein when the power supply voltage is boosted by the booster circuit, the control circuit inputs a pulse signal to the second capacitor.

5. The encoder according to claim 4,
   wherein a capacity value of the first capacitor is higher than the capacity value of the second capacitor.

6. The encoder according to claim 5, further comprising:
   a third capacitor inserted between two ends of the battery,
   wherein the capacity value of the third capacitor is higher than the capacity value of the first capacitor and the capacity value of the second capacitor.

7. The encoder according to claim 1,
   wherein the driver circuit includes
   a switch, current source, and first transistor provided in a cascaded connection between the battery and the ground; and
   a second transistor where the voltage between the light-emitting element and the driver circuit is applied to one end of the second transistor, another end is connected to the ground, and the second transistor configures, with the first transistor, a current mirror, wherein the control circuit controls opening and closing of the switch.

8. The encoder according to claim 7, further comprising:
   a third diode where the voltage between the light-emitting element and the driver circuit is applied to an anode of the third diode, and a cathode is connected between the battery and the switch, current source, and first transistor.

9. A light source of an encoder that includes a scale receiving light, a photoreceiver receiving the light from the scale and outputting a signal corresponding to the received light, and a signal processor calculating a positional relationship between the photoreceiver and the scale in accordance with the signal from the photoreceiver, the encoder emitting the light at the scale of the encoder, the light source comprising:
   a battery;
   a booster circuit that boosts a power supply voltage output by the battery, and that outputs the boosted voltage;
   a light-emitting element, to one end of which is applied the boosted voltage;
   a driver circuit inserted between another end of the light-emitting element and a ground, the driver circuit controlling current flowing through the light-emitting element;
   a voltage detector circuit that detects a voltage between the light-emitting element and the driver circuit; and
   a control circuit that controls the booster circuit to boost the power supply voltage when the voltage detected by the voltage detector circuit is lower than the power supply voltage, that stops the boosting performed by the booster circuit when the voltage detected by the voltage detector circuit is equal to the power supply voltage, and that controls the driver circuit such that, after the boosted voltage applied to the light-emitting element reaches a predetermined value, current flows to the light-emitting element.

10. The light source of the encoder according to claim 9,
wherein the voltage detector circuit is an analog/digital converter where the voltage between the light-emitting element and the driver circuit is input,
the input voltage is converted to a digital signal, and the converted digital signal is output to the control circuit, and
the control circuit controls the boosting performed by the booster circuit in accordance with a value of the digital signal.

11. The light source of the encoder according to claim 9,
wherein the voltage detector circuit is configured as a comparator that compares the power supply voltage applied to one input terminal with the voltage applied to another input terminal, between the light-emitting element and the driver circuit, and that outputs a comparison result to the control circuit, and
the control circuit controls the boosting performed by the booster circuit in accordance with the comparison results.

12. The light source of the encoder according to claim 9,
wherein the booster circuit includes:
 a first diode, to an anode of which the power supply voltage is applied;
 a first capacitor, one end of which is connected to the ground;
 a second diode, an anode of which is connected to a cathode of the first diode, and a cathode of which is connected to a high potential-side end of the light-emitting element and to another end of the first capacitor; and
 a second capacitor, one end of which is connected to the control circuit, and another end of which is connected to the cathode of the first diode and to the anode of the second diode, wherein when the power supply voltage is boosted by the booster circuit, the control circuit inputs a pulse signal to the second capacitor.

13. The light source of the encoder according to claim 12,
wherein a capacity value of the first capacitor is higher than the capacity value of the second capacitor.

14. The light source of the encoder according to claim 13, further comprising:
 a third capacitor inserted between two ends of the battery,
 wherein the capacity value of the third capacitor is higher than the capacity value of the first capacitor and the capacity value of the second capacitor.

15. The light source of the encoder according to claim 9,
wherein the driver circuit includes:
 a switch, current source, and first transistor provided in a cascaded connection between the battery and the ground; and
 a second transistor where the voltage between the light-emitting element and the driver circuit is applied to one end of the second transistor, another end is connected to the ground, and the second transistor configures, with the first transistor, a current mirror, wherein the control circuit controls opening and closing of the switch.

16. The light source of the encoder according to claim 15, further comprising:
 a third diode where the voltage between the light-emitting element and the driver circuit is applied to an anode of the third diode, and a cathode is connected between the battery and the switch, current source, and first transistor.

* * * * *